United States Patent [19]
Rath

[11] Patent Number: 5,564,321
[45] Date of Patent: Oct. 15, 1996

[54] CAN TRIMMER

[76] Inventor: Hans M. Rath, 116 Sproul La., Staunton, Va. 24401

[21] Appl. No.: 415,313

[22] Filed: Apr. 3, 1995

[51] Int. Cl.[6] .................................................. B23D 21/04
[52] U.S. Cl. ........................ 83/98; 82/54; 82/85; 83/186; 83/733
[58] Field of Search .............................. 83/186, 187, 337, 83/733, 98; 82/47, 54, 81, 85, 86, 87, 89, 90, 79, 101

[56] References Cited

U.S. PATENT DOCUMENTS

| | | |
|---|---|---|
| 1,421,263 | 6/1922 | Lea . |
| 3,425,251 | 2/1969 | Maytag . |
| 3,704,649 | 12/1972 | Von Den Hoff ........................ 82/122 |
| 3,878,743 | 4/1975 | Melind ................................... 82/54 |
| 3,881,380 | 5/1975 | Paramonoff ........................... 83/337 |
| 3,916,740 | 11/1975 | Stroobants . |
| 3,960,099 | 6/1976 | Dobias ................................... 82/101 |
| 3,994,251 | 11/1976 | Hake ..................................... 82/85 |
| 4,014,228 | 3/1977 | Dean . |
| 4,181,050 | 1/1980 | Stroobants et al. . |
| 5,054,341 | 10/1991 | Johansson et al. . |
| 5,146,818 | 9/1992 | Hellweg .................................. 82/54 |
| 5,231,859 | 8/1993 | Bailey ................................... 72/20 |

*Primary Examiner*—Kenneth E. Peterson
*Assistant Examiner*—Sean A. Pryor
*Attorney, Agent, or Firm*—Nixon & Vanderhye

[57] ABSTRACT

The can trimmer includes first and second supports adjustably mounted on bars for adjustably spacing the supports from one another dependent upon the height of the cans to be trimmed. The supports mount a motor-driven splined shaft for rotating first and second carrier wheels and star wheels between the carrier wheels. Cam-actuated pushers are mounted on the pusher carrier wheel and mandrels are carried on the other carrier wheel in axial opposition to the pushers. Cam-actuated trim heads are pivotally carried by the second carrier wheel for movement toward and away from the mandrels, respectively. Upon disposition of cans on the star wheels between the pushers and mandrels, the pushers carry the cans onto the mandrels for cutting by the trim heads. Air pressure pushes the cans off the mandrels in following engagement with the pushers for discharge.

19 Claims, 13 Drawing Sheets

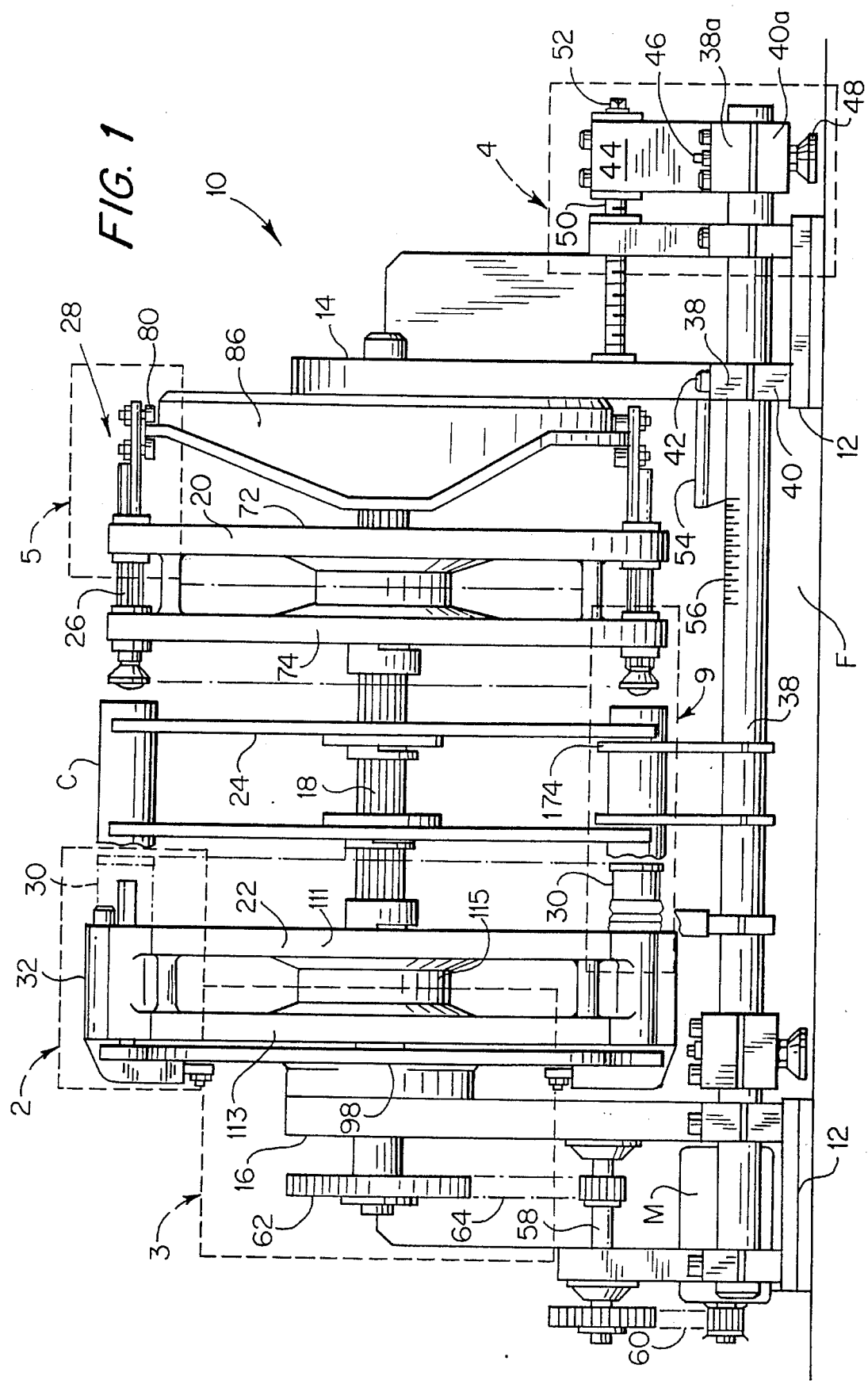

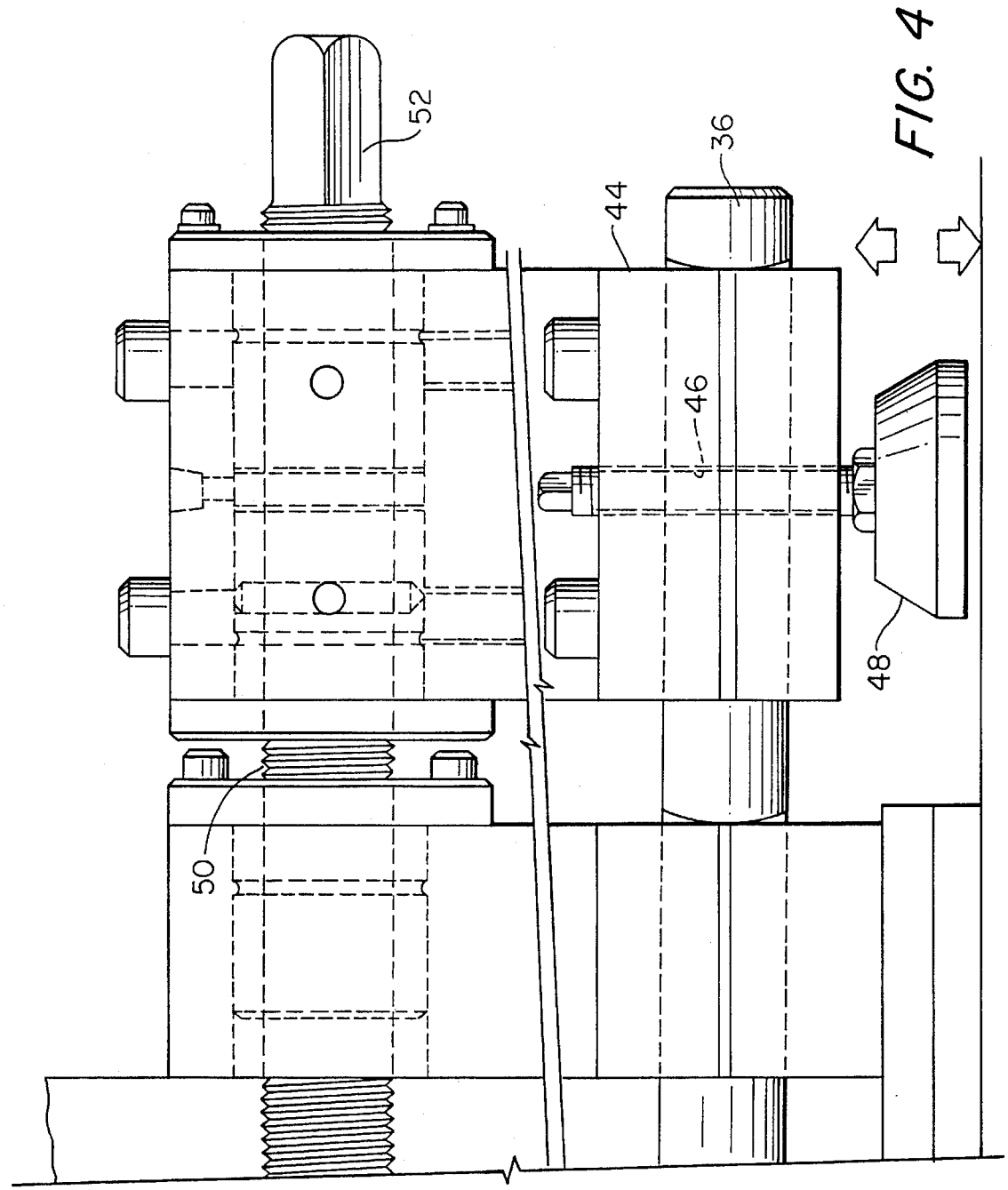

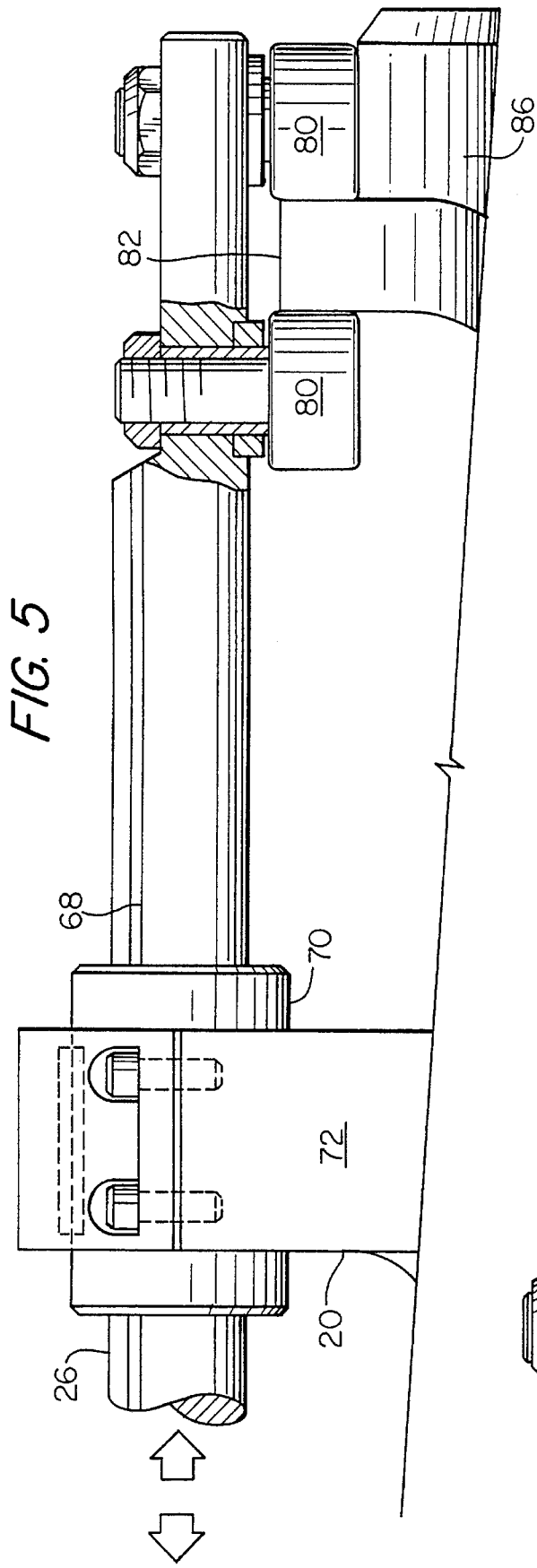
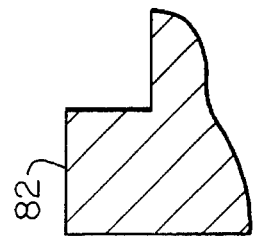
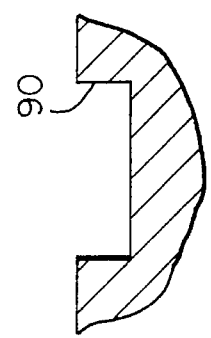
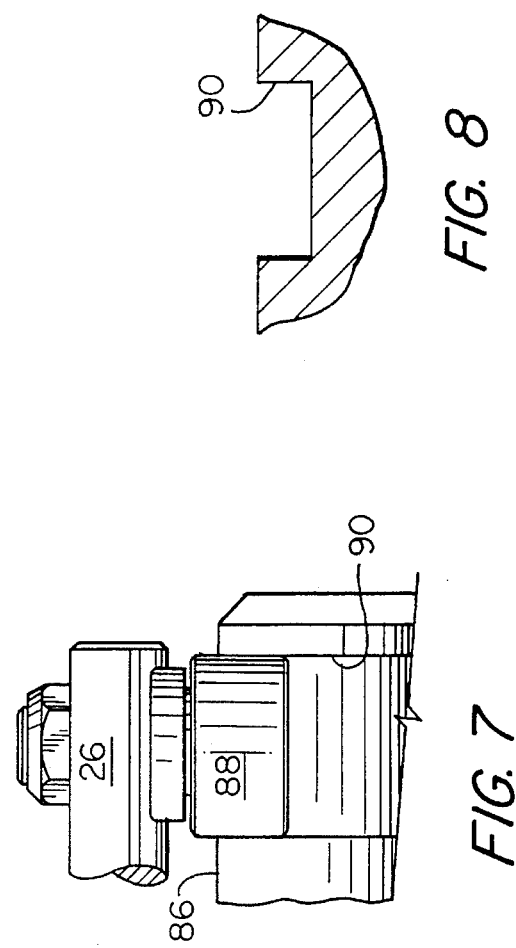

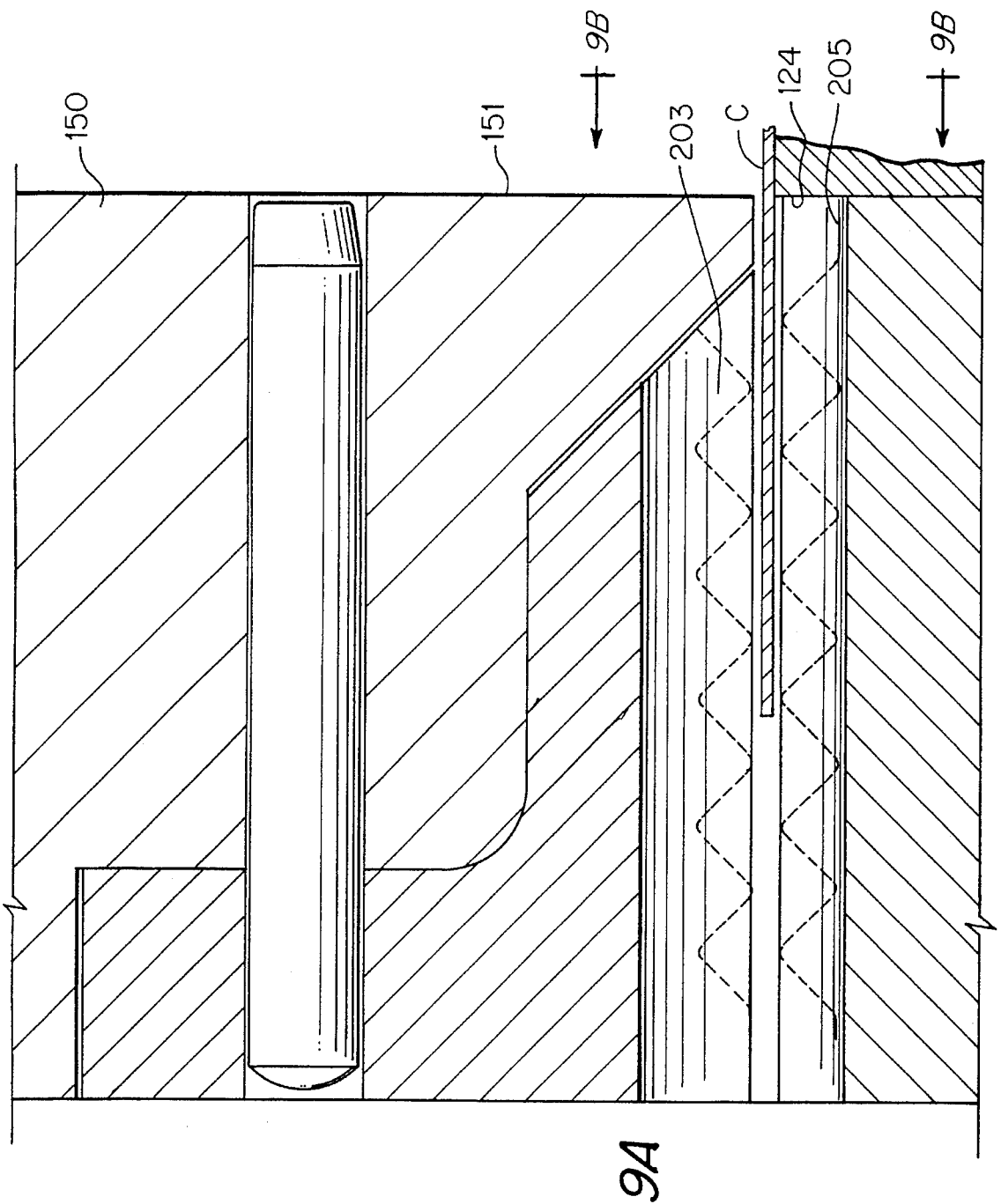

CAN TRIMMER

TECHNICAL FIELD

The present invention relates to an apparatus for trimming the open ends of cans as part of a process for manufacturing cans and particularly relates to a can trimming apparatus for cutting the uneven cylindrical open ends of the cans automatically and at high speeds.

BACKGROUND

It will be appreciated that hundreds of millions of cans are produced for use every day. Most such cans are formed of aluminum, although a very small fraction, e.g., about 1%, are currently manufactured of steel. The process for manufacturing cans is well known and essentially requires as a first step the formation of a circular blank of metal material, typically aluminum. In a punching stroke which initially redraws the material and then irons it to thin and stretch the can walls, a fully formed can is provided having circular side walls, a shaped bottom, and a top open end, the edges of which are uneven or wavy. As will be appreciated, a can top is secured to the cylindrical portion of the open end of the can and, consequently, the open end of the can must be sheared or trimmed to mate with the top in very precise fashion.

Trimmers for trimming the uneven or wavy open end of cans have been constructed in the past. These trimmers, however, are complicated and expensive machines. For example, cans of different heights require trimming and the machine must therefore be adjustable to accommodate that requirement. Additionally, the cut scrap material must be removed from the open end of the can, as well as the trimming machine. Also, a precision even cut about the circumference of each can is required. All of these considerations, as well as others, must be accommodated in a can trimming machine which is also capable of very high speed production, e.g., 2000 cans/minute. In efforts to achieve those goals, conventional machines are subject to breakdown and are oftentimes considered the weak link in the production of cans.

DISCLOSURE OF THE INVENTION

In accordance with the present invention, there is provided a novel and improved can trimmer for trimming the open ends of cans during their production which can operate reliably at high production speeds and accommodate cans of different heights. Particularly, the can trimmer of the present invention includes a base comprising a pair of bars supporting a pair of first and second supports which, in turn, support a main spindled drive shaft. The drive shaft mounts a first carrier wheel carrying a plurality of axially displaceable pushers at circumferentially spaced positions about the carrier wheel, and a second carrier wheel having a plurality of trim head assemblies including mandrels located at circumferentially spaced positions projecting toward and about the second carrier wheel and in axial alignment with the pushers of the first carrier wheel. Each trim head assembly carried by the second carrier wheel also includes, in association with each mandrel, a trim head movable, preferably pivotally, toward and away from the mandrel. The mandrel and trim head carry cooperating knife edges for precisely cutting the open end of the can in response to pivotal movement of the trim head toward the mandrel and rotation of the mandrel.

A first cam mechanism is cooperable between the first support and the first carrier wheel for advancing and retracting the pushers in a timed relation toward and away from the mandrels during rotation of the first carrier wheel. The cam mechanism includes a fixed cam surface carried by the first support and cam follower surfaces carried for rotation with the first carrier wheel. A second cam mechanism is provided cooperable between the second support and the second carrier wheel to move, e.g., pivot, the trim heads toward and away from the mandrels. Particularly, the second cam mechanism includes a cam track carried by an end face of a sun gear and a cam follower mounted on the end of a lever whereby the lever is pivoted to displace the trim head toward and away from the mandrel in accordance with the circumferential position of the mandrel and trim head about the axis of the drive shaft. Planetary gears engage the sun gear to rotate spindles mounting the mandrels and the knife edges carried thereby. Between the carrier wheels and between the axially aligned pushers and mandrels, there are provided one or more star wheels for carrying cans about the drive shaft between a can input station and a can discharge station.

By rotating the drive shaft, the first and second carrier wheels and star wheels are rotated about the axis of the shaft. The star wheels pick up cans in succession from the can input station for location between the pushers and mandrels. As the wheels rotate, each pusher is successively cammed by the first cam mechanism into engagement with a can to press the can onto an axially aligned mandrel. At a predetermined circumferential location about the axis of the drive shaft, each mandrel is supplied with air under pressure to pressurize the interior of the can, maintaining it in following engagement with the pusher. Simultaneously, the second cam mechanism displaces the trim head toward the mandrel to cut the uneven open end of the can. After cutting and with air pressure being continuously supplied within the can, the first cam mechanism successively retracts each pusher, enabling the air pressure to displace the can in following engagement with the retracting pusher off the mandrel, while the scrap ring left on the mandrel is cut axially and beaded for discharge. Once the can clears the mandrel, it is discharged from the star wheels via the discharge station.

In a preferred embodiment according to the present invention, there is provided a can trimmer comprising a rotatable main drive shaft, first and second spaced supports for supporting opposite ends of the shaft, a first carrier wheel carried for rotation by the drive shaft and carrying a plurality of pushers at circumferentially spaced locations about the carrier wheel, a first cam mechanism carried by the first support cooperable with the pushers for advancing and retracting the pushers in directions generally parallel to the axis of the drive shaft at predetermined circumferential locations about the shaft, a second carrier wheel carried by the shaft for rotation therewith and carrying a plurality of mandrels at circumferentially spaced positions thereabout in axial alignment with the pushers, respectively, a plurality of trim heads carried by the second carrier wheel at circumferentially spaced positions thereabout and mounted for rotation with the second carrier wheel, the trim heads being disposed adjacent corresponding mandrels, respectively, each trim head being pivotally mounted on the second carrier wheel for pivotal movement toward and away from a corresponding mandrel for trimming excess material from a can, a second cam mechanism carried by the second support cooperable with the trim heads for pivoting the trim heads toward and away from respective corresponding mandrels at predetermined circumferential locations about the shaft and at least one can carrier wheel carried by the shaft for rotation therewith and disposed between the first and second carrier wheels for receiving untrimmed cans for location between the pushers and the mandrels, the pushers under control of the first cam mechanism enabling axial displacement of the cans onto corresponding mandrels for trimming by the trim heads upon pivoting thereof toward the mandrels.

In a further preferred embodiment according to the present invention, there is provided a can trimmer comprising a rotatable main drive shaft, first and second spaced supports for supporting opposite ends of the shaft, a first carrier wheel carried for rotation by the drive shaft and carrying a plurality of pushers at circumferentially spaced locations about the carrier wheel, a first mechanism carried by the first support cooperable with the pushers for advancing and retracting the pushers in directions generally parallel to the axis of the drive shaft at predetermined circumferential locations about the shaft, a second carrier wheel carried by the shaft for rotation therewith and carrying a plurality of mandrels at circumferentially spaced positions thereabout in axial alignment with the pushers, respectively, a plurality of trim heads carried by the second carrier wheel at circumferentially spaced positions thereabout and mounted for rotation with the second carrier wheel, the trim heads being disposed adjacent corresponding mandrels, respectively, each trim head being mounted on the second carrier wheel for movement toward and away from a corresponding mandrel for trimming excess material from a can, a second mechanism carried by the second support cooperable with the trim heads for moving the trim heads toward and away from respective corresponding mandrels at predetermined circumferential locations about the shaft, the pushers under control of the first mechanism enabling axial displacement of the cans onto corresponding mandrels for trimming by the trim heads upon movement thereof toward the mandrels.

Accordingly, it is a primary object of the present invention to provide a novel and improved can trimmer for precisely trimming the open end of cans undergoing manufacture in an efficient, reliable manner at high production speeds and capable of trimming cans of different heights and different diameters by changing the tooling.

BRIEF DESCRIPTION OF THE DRAWINGS

FIG. 1 is a side elevational view of a can trimmer constructed in accordance with the present invention;

FIG. 4 is an enlarged fragmentary view of an adjustment mechanism for adjusting the spacing of the carrier wheels and, hence, adjusting the can trimmer for trimming different heights of cans;

FIG. 5 is an enlarged fragmentary side elevational view with portions in cross-section illustrating a first cam mechanism for a pusher of the can trimmer hereof;

FIG. 6 is an enlarged view of the rib forming part of the cam mechanism of FIG. 5;

FIG. 7 is a view similar to FIG. 5 illustrating a second form of a cam mechanism;

FIG. 8 is a fragmentary cross-sectional view of portions of the first cam mechanism illustrated in FIG. 7;

FIG. 9A is an enlarged longitudinal cross-sectional view illustrating the cooperation of the beading rollers;

BEST MODE FOR CARRYING OUT THE INVENTION

Figure 1A:
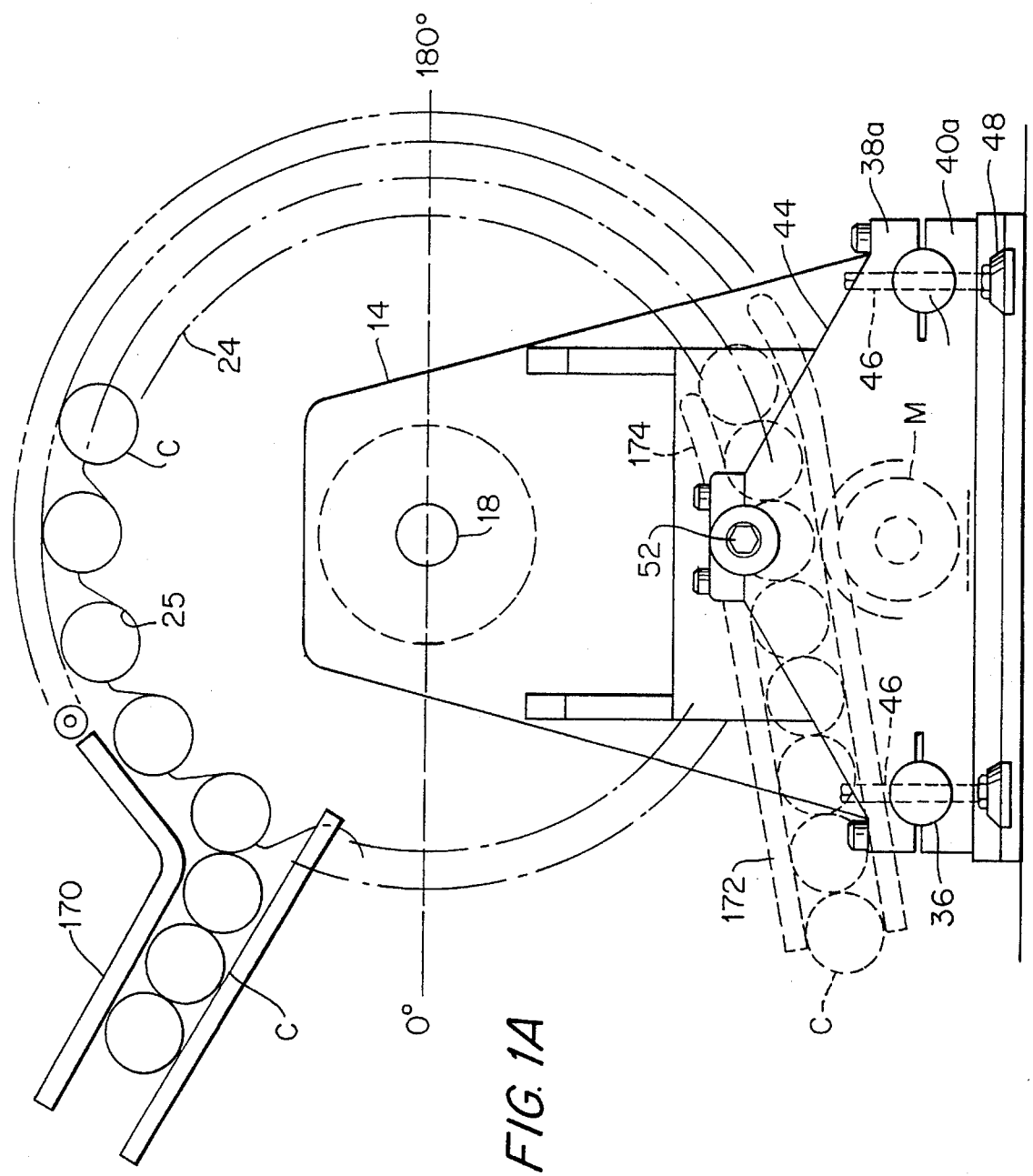
FIG. 1A is a schematic end elevational view of the can trimmer hereof illustrating can input and can discharge stations about the can trimmer.

Referring now to the drawings, particularly to FIG. 1, there is illustrated a can trimmer constructed in accordance with the present invention and generally designated 10. Can trimmer 10 generally includes a base 12 mounting first and second supports 14 and 16, respectively, which in turn carry a main splined drive shaft 18. First and second carrier wheels 20 and 22, respectively, are carried for rotation by main shaft 18. Disposed between the carrier wheels 20 and 22 is at least one, and preferably a pair, of star wheels 24 for carrying cans C in arcuately shaped pockets 25 (FIG. 1A) about the periphery of the star wheels 24. First carrier wheel 20 carries a plurality of pushers 26 operatively controlled by a first cam mechanism, generally designated 28 (FIGS. 1 and 5), for movement in generally axial directions for locating cans carried by the star wheels on mandrels 30 carried by the carrier wheel 22 and enabling removal of the cans from the mandrels after their tops have been trimmed. Each mandrel 30 has an associated trim head 32 which, under the control of a second cam mechanism, generally designated 34 in FIG. 2A, pivots each trim head 32 into engagement with a can on mandrel 30 such that cooperating knives on the trim head and mandrel trim the open end of the can C. The mandrels 30 and trim heads 32 form part of trim head assemblies.

Turning now more specifically to the various component parts of can trimmer 10, base 12 includes a pair of laterally spaced bars 36 on which supports 14 and 16 are releasably clamped. Particularly, each of the supports 14 and 16 at its lower end has at opposite sides of trimmer 10 split flanges 38 and 40 defining openings receiving bars 36 whereby bolts 42 received through one flange and threaded into the other flange releasably secure the supports 14 and 16 to the bars 36. It will be appreciated that by releasing the bolts 42, the support 14, for example, may be longitudinally displaced along bars 36 to adjust the spacing between the carrier wheels 20 and 22 and, hence, the height of the cans being trimmed, as will become apparent from the ensuing description. To displace one of the supports relative to the other support, for example, to displace support 14 horizontally toward support 16 and into an accurately determined position vis-a-vis support 16, an end mount 44 is provided adjacent one end of the bars. The mount has split flanges 38a and 40a on opposite sides of recesses for receiving the bars 36. Mount 44 also includes a pair of elevating screws 46 such that by threading each elevating screw 46, a foot 48 of each screw may be selectively brought into engagement with floor F. Further rotation of the elevating screw 46 raises support 14 from engagement with the floor F. The upper end of end mount 44 carries an Acme screw 50 having an end 52 to which a wrench may be applied. The Acme screw 50 is threaded to support 14 and journalled to mount 44. Accordingly, when the support 14 has been released relative to the bars 36 by unthreading bolts 42, and the elevation screws 46 have raised support 14 from floor F, the Acme screw 50 may be torqued to displace the support 14 longitudinally along the bars 36. It will also be appreciated that there is a bearing connection between the support 14 and main shaft 18 whereby the support can be displaced longitudinally along shaft 18 and rotatably support shaft 18. An indicator 54 is movable with support 14 and gradations may be provided along one or both bars 36 such that the machine can be adjusted for different heights of cans to be trimmed. Optionally, the support 16 carried at the opposite end of the machine can also be adjusted along the bars 36 by using a similar split flange and elevating screw arrangement.

At the opposite end of the can trimmer 10, there is provided a motor M, for example, a five-horsepower A.C. motor, for driving main shaft 18. Particularly, motor M is coupled to an idler shaft 58 through a belt drive 60, the idler shaft 58 being carried on support 16. The distal end of splined main shaft 18 carries a pulley 62 which is driven by a belt 64 coupled to the idler shaft 58.

Figure 9:
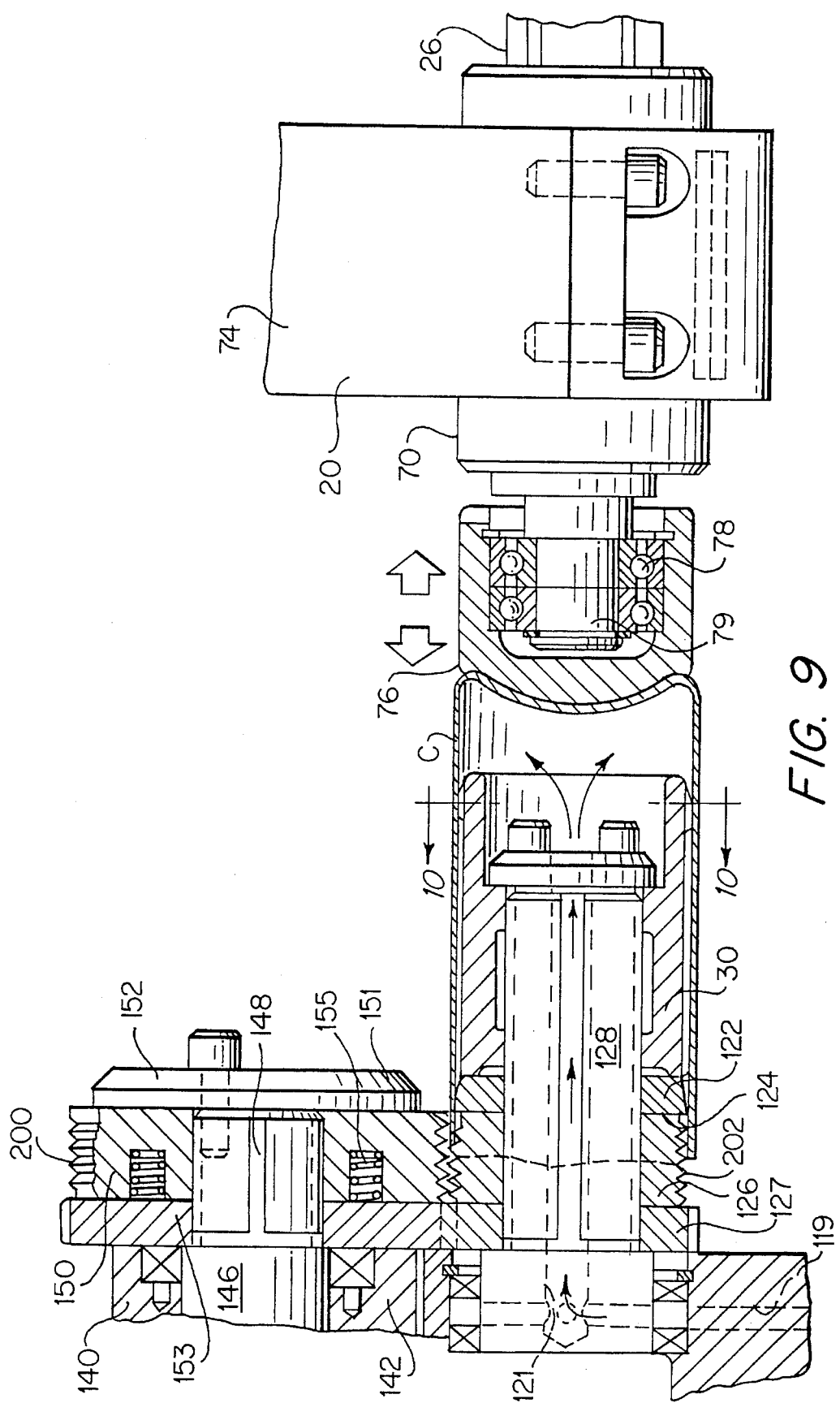
FIG. 9 is an enlarged fragmentary cross-sectional view illustrating a can on a mandrel in position for a trimming operation.
Figure 9B:
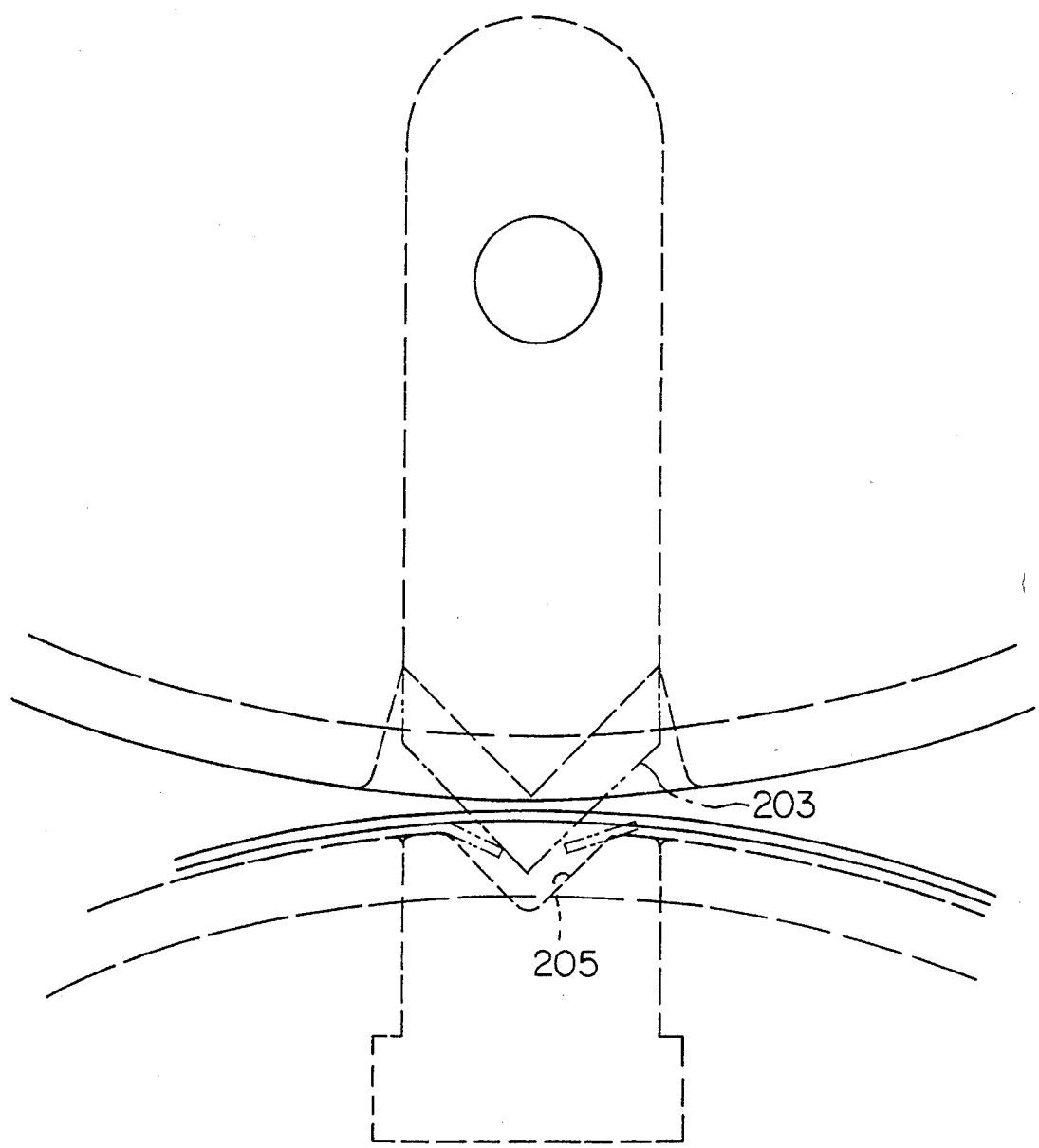
FIG. 9B is an end view thereof taken about on line 9B—9B in FIG. 9A.

Referring now to FIGS. 1, 5 and 9, there is illustrated a mounting for pushers 26 on the carrier wheel 20. As illustrated, pushers 26 comprise splined shafts 68 mounted in suitable bushings 70 secured to the carrier wheel 20 at circumferentially spaced locations about its periphery. Carrier wheel 20 is divided into two axially spaced wheel sections 72 and 74, rigidly connected one with the other at a central hub and each section mounts a bushing 70. The distal ends of the pushers 26 mount pusher heads 76. As illustrated in FIG. 9, each pusher head 76 is rotatably mounted on roller bearings 78, the inner races of which are carried on a stub shaft 79 on the end of a pusher 26. The end of each head 76 may be shaped to correspond to the typical concave shape of the bottom of the can as illustrated. A universal mounting for the heads 76 may be provided as an alternative to the illustrated bearing arrangement.

The first cam mechanism 28 is carried by the first support 14 and is cooperable with pushers 26 for advancing and retracting the pushers in directions generally parallel to the axis of shaft 18 at predetermined circumferential locations of the pushers about the shaft. The first cam mechanism for each pusher 26 includes a cam follower at its proximal end for following a cam surface. Particularly, as illustrated in FIG. 5, each pusher 26 carries a pair of spaced rollers 80 on opposite sides of a cam track 82, preferably a raised rib. Thus, the rollers 80 straddle the raised rib 82. Raised rib 82 is fixed to the support 14 and comprises an annular, radially outwardly projecting rib formed about a portion of a cylindrical drum 86 fixed to support 14, the rib 82 being disposed at various axial positions about drum 86. Thus, it will be appreciated, that as the first carrier wheel 20 rotates with the splined shaft 18, the rollers 80 will follow the axial location of the cam track 82, hence axially displacing the pushers 26 toward and away from the cans dependent upon the circumferential location of the pushers about drum 86. An alternate form of the first cam mechanism 28 is illustrated in FIGS. 7 and 8. In FIG. 7, the proximal end of each pusher 26 is provided with a single cam follower, e.g., a roller 88. The drum 86 fixed to support 14 may be provided with a cam track, e.g., a groove 90 formed about the drum. Consequently, as the carrier wheel 20 rotates and the rollers 88 follow the rotation in the groove 90, the rollers will cause the pushers 26 to advance and retract in accordance with the circumferential position of the pushers about the axis of shaft 18.

Figure 2:
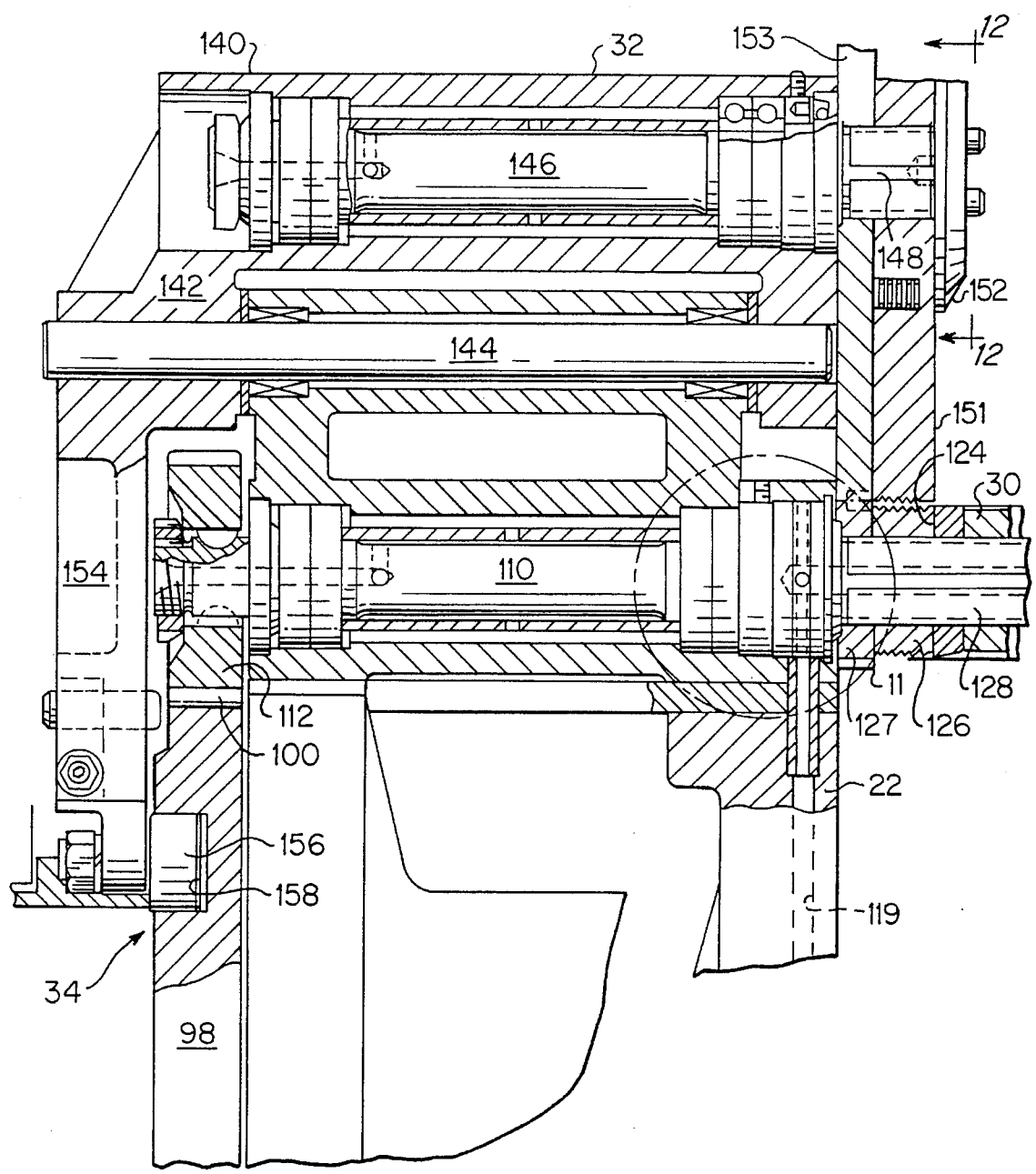
FIG. 2 is an enlarged fragmentary cross-sectional view of a trim head and associated trim head assembly including a mandrel adjacent the periphery of a second carrier wheel.
Figure 3:
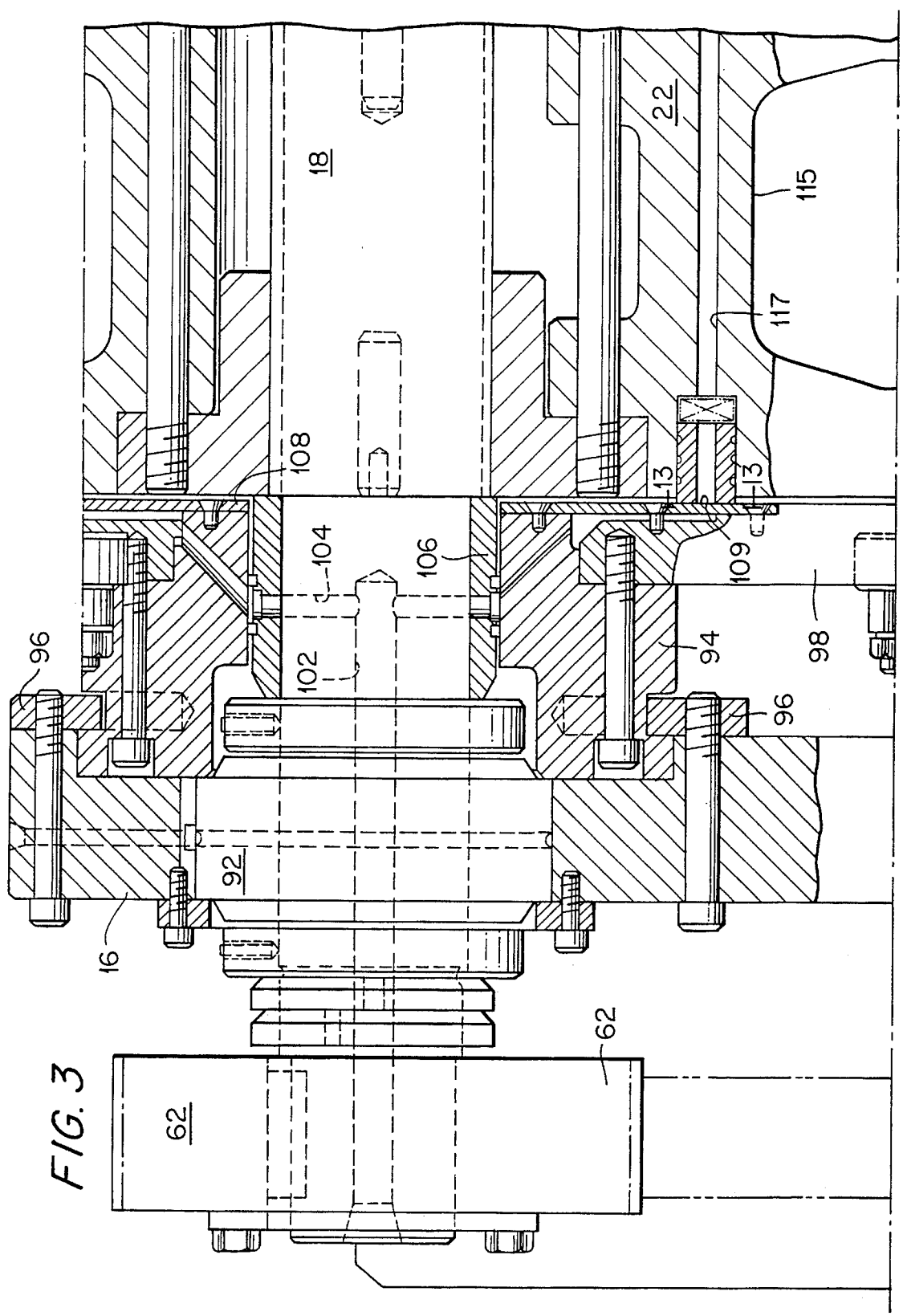
FIG. 3 is an enlarged fragmentary cross-sectional view illustrating a carrier wheel mounted on a main drive shaft of the trimmer hereof.

Referring now to FIG. 3, it will be appreciated that the shaft 18 is mounted in bearings carried by supports 14 and 16, only one bearing 92 being illustrated in FIG. 3. A timing hub 94 is secured to support 16 by clamps 96. Also secured to the timing hub 94 is a sun gear 98 having outer peripheral teeth 100 (FIG. 2). It will thus be appreciated that the sun gear 98 is fixed to support 16. For reasons discussed hereafter, the shaft 18 has an axial fluid, e..g, air, passage 102 in communication with a plurality of radial passages 104, in turn in periodic communication with passages 106 formed in the timing hub 94. A disk 108 is fixed to the inner face of the timing hub 94 and sun gear 98 in a recess in sun gear 98. The disk has a generally arcuately-shaped opening 109 in communication with the passages 106. Second carrier wheel 22 is similarly divided into two axially spaced wheel sections 111 and 113 rigidly connected to one another at a hub 115. Passages 117 located within hub 115 are provided for communicating air to mandrels via radial passages 119 (FIG. 2) and axial passages 121 in projecting shafts 128 (FIG. 9).

Figure 10:
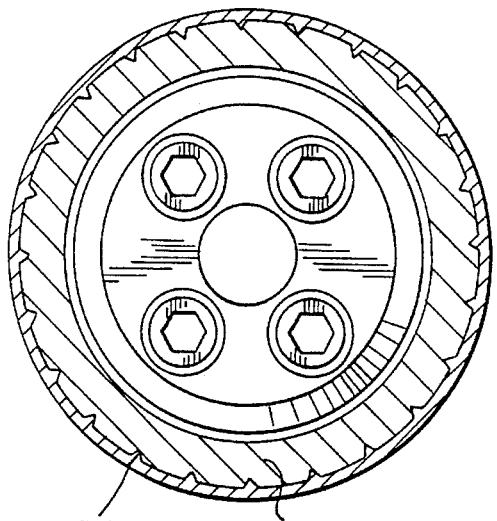
FIG. 10 is a cross-sectional view thereof taken generally about on line 10—10 in FIG. 9.
Figure 13:
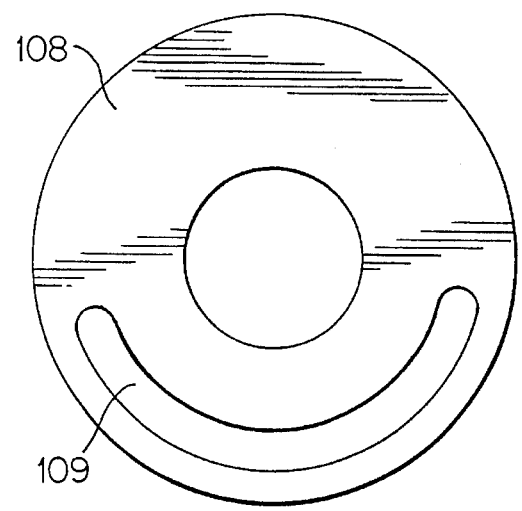
FIG. 13 is a fragmentary elevational view illustrating a valve mechanism for supplying fluid under pressure to the mandrels.
Figure 12:
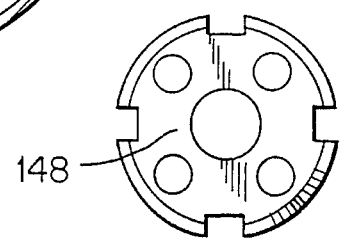
FIG. 12 is an end view of the trimming spindle taken about on line 12—12 in FIG. 2.
Figure 11:
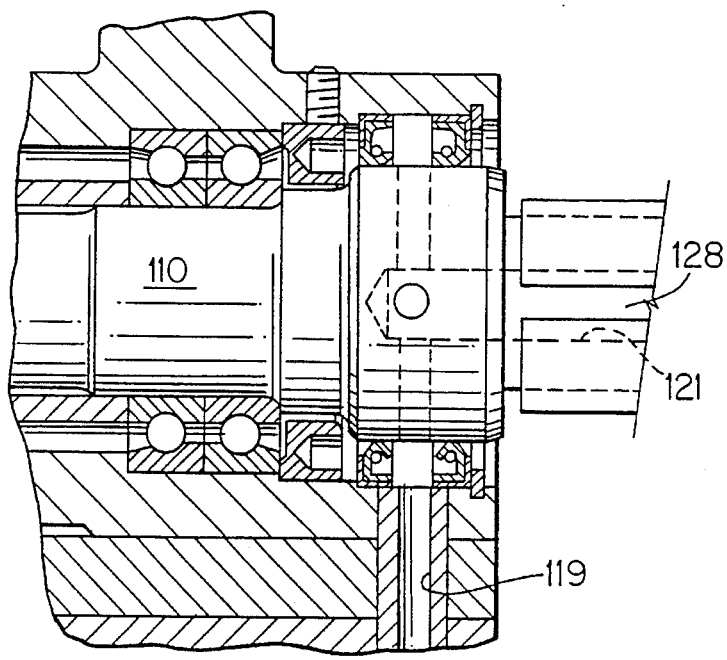
FIG. 11 is an enlarged fragmentary cross-sectional view of the circled portion in FIG. 2.
Figure 14:
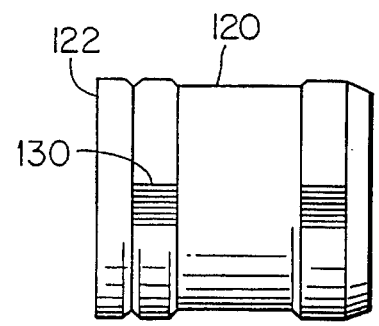
FIG. 14 is a side elevational view of a mandrel illustrating the axially extending flutes.

Referring now to FIG. 2, and as part of the trim head assemblies located at a plurality of circumferentially spaced positions about the second carrier wheel 22, there are mounted a plurality of spindles 110 rotatably carried by the carrier wheel 22 at circumferentially spaced positions thereabout. The rear end of each spindle 110 carries a planetary gear 112 in meshing engagement with the outer peripheral teeth 100 of the sun gear 98. Consequently, as the second carrier wheel 22 rotates relative to the fixed sun gear 98, the meshing engagement of the sun gear teeth 100 and the teeth of planetary gears 112 rotates the spindles 110. Each spindle 110, as illustrated in FIG. 9, carries a mandrel 30 including a knife blade 122 having a knife edge 124, a beading roller 126 described hereafter, and a drive gear 127. The mandrel 30, knife blade 122, beading roller 126, and drive gear 127 are mounted on a projecting shaft 128 formed on the spindle 110. As best illustrated in FIG. 10, the external surfaces of the mandrels 30 are fluted in an axial direction. That is, the outer peripheral surface of each mandrel is provided with circumferentially spaced, axially extending grooves 130. Additionally, the outside diameter of each mandrel is slightly larger than the inside diameter of the can to be trimmed such that, upon placement of the can about the mandrel, as illustrated in FIG. 9, a tight friction fit is provided which precludes the can from rotating relative to the mandrel.

Referring back to FIG. 2, each trim head assembly also includes a trim head 140 comprised of a housing 142 pivotally mounted to the carrier wheel 22 by a pin 144 securing the head 140 to the carrier wheel 22 for pivotal movement about the axis of pin 144. The head 140 includes a spindle 146 rotatably mounted on bearings and having a forward end carrying a stub shaft 148 (FIG. 9) to which is secured a beading roller 150 by means of a stop 152 and a driven gear 153 when engaged with drive gear 127 as described hereafter. Beading roller 150 has a knife edge 151. It will be appreciated that by pivoting the trim head 140 about the axis of pin 144, the beading roller 150 carried by the trim head may be displaced toward and away from the mandrel 30. When the trim head is displaced toward the mandrel and a can lies about the mandrel 30, the knife edge 151 cooperates with the knife edge 124 of the mandrel to provide a scissors-type cutting action, trimming the open end of the can as the mandrel 30 rotates the can about the axis of the mandrel and the knife edge 151 and 122 rotate. Movement of the trim head 140 away from the mandrel enables the can to be released from the mandrel and a new can inserted onto the mandrel. As illustrated, die springs 155 maintain the knife edge 151 against stop 152, even after regrinding.

Figure 2A:
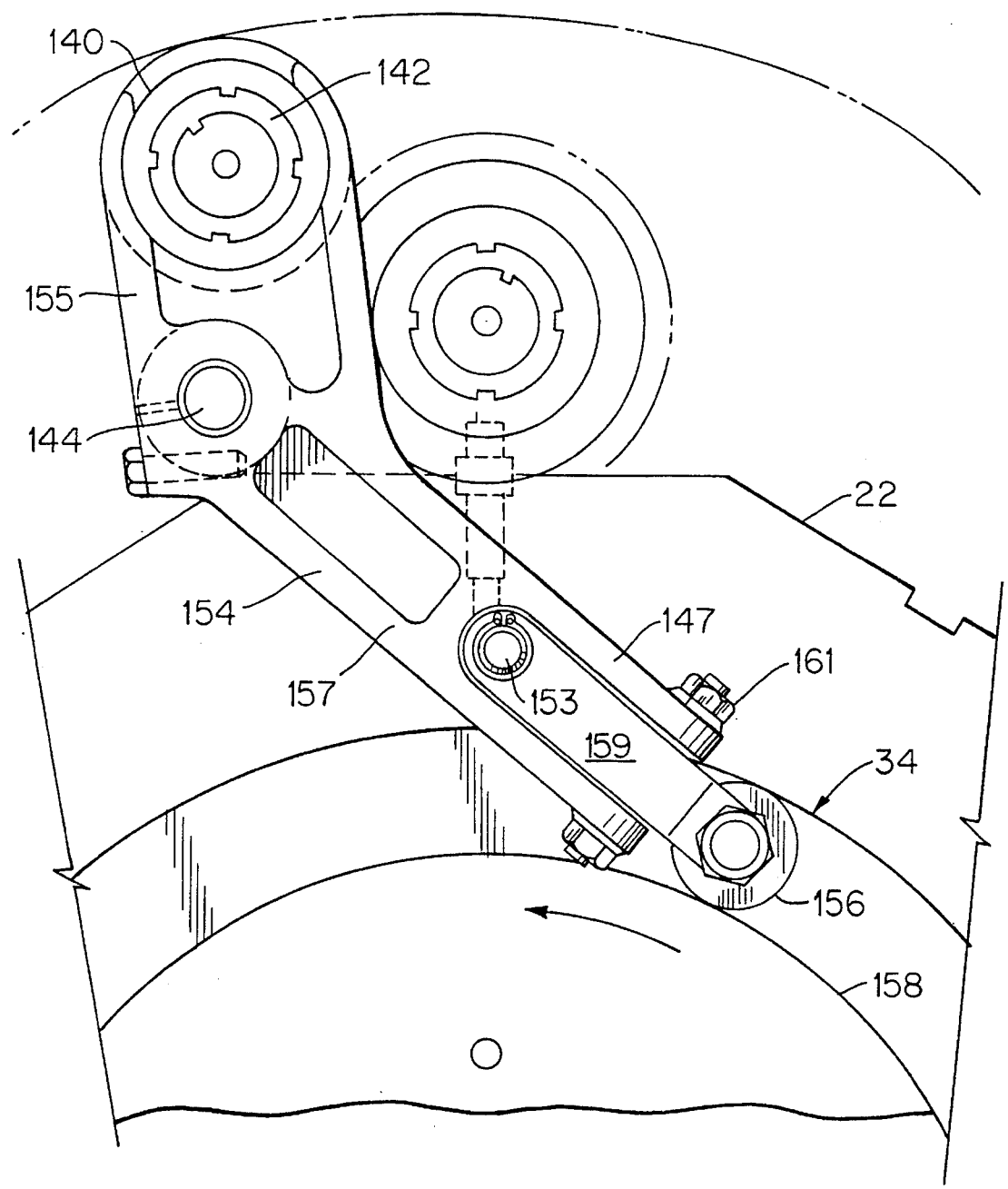
FIG. 2A is a fragmentary enlarged end elevational view illustrating a second cam mechanism for the trim head assembly and looking from left to right in FIG. 1.

To pivot the trim head 140 toward and away from mandrel 30, the housing 142 carrying head 140 is pivoted about the axis of pin 144 by the second cam mechanism 34. Referring to FIGS. 2 and 2A, each housing 142 includes a integral two-part lever arm 154 on respective opposite sides of the pin 144 from trim head 140. Lever arm 154 includes an angled element 155 mounting the head 140 at one end on one side of the axis of pin 144. Lever arm 154 also includes a fork 147 at its opposite end forming part of a second element 157 on the opposite side of the axis of the pin 144. Lever arm 154 further includes a third element 159 received within the fork 147 and pivotally mounted therein by a pin 153 secured to an underlying part of fork 147. The pivot angle between elements 157 and 159 is adjustable by set screws with lock nuts 161 threaded to fork 147 and bearing against element 159 to afford adjustment of the gap between the knife edges 124 and 151. That is, to ensure that the gap between the knife edges 124 and 1 51 is sufficiently large to enable the can on the mandrel 30 to extend in the gap, lever 159 may be pivotally adjusted about pin 153, thereby adjustably spacing the trim head relative to the mandrel, and locked by the set screws 161. The distal end of element 159 terminates in a cam follower, e.g., a cam roller 156. The cam roller 156 is disposed in a continuous cam track or groove 158 formed on the face of sun gear 98. Consequently, by configuring the track 158, the trim heads 140 may be pivoted toward and away from the associated mandrels at selected circumferential positions of the carrier wheel 22 about the axis of shaft 18.

Figure 15:
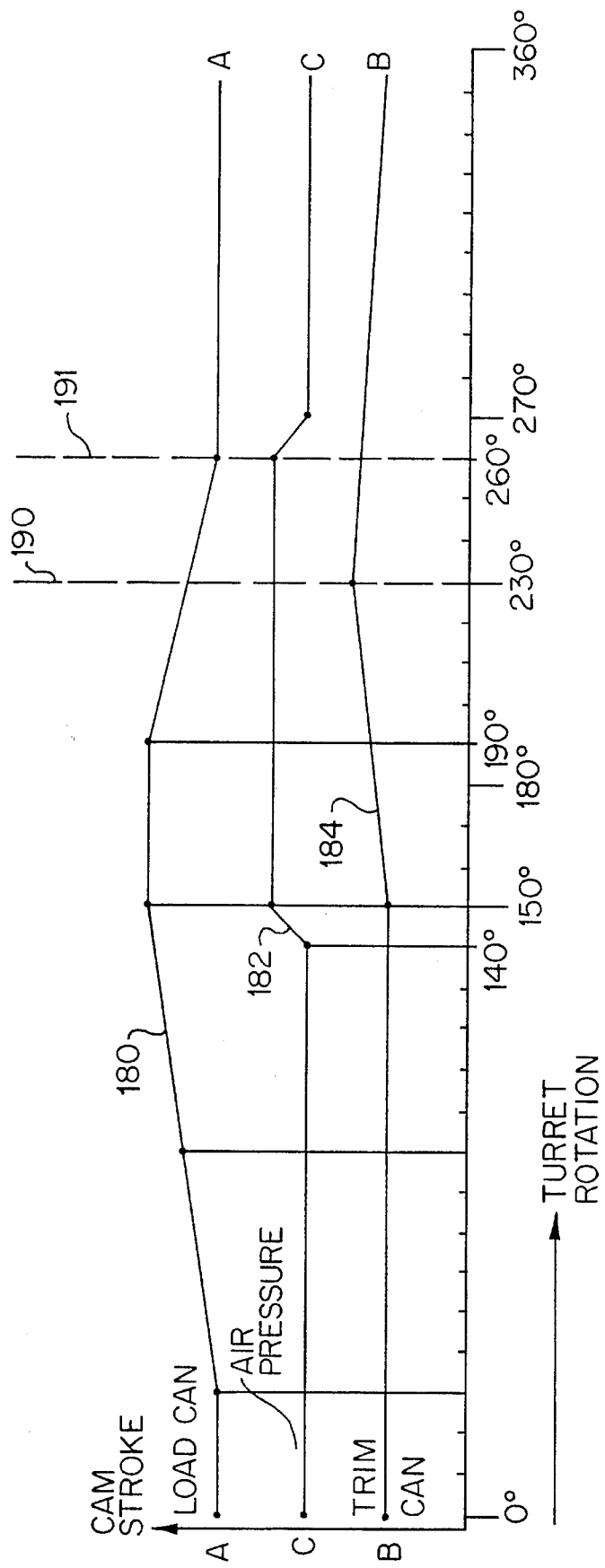
FIG. 15 is a timing diagram illustrating the stroke of the pushers and trim heads as well as the air pressure supply as a function of the rotational position of the carrier wheels.

Referring now to FIG. 15, there is illustrated a schematic diagram of the operating characteristics of the first and second cam mechanisms, as well as the air pressure supplied to the mandrels. Particularly, in FIG. 15, there is illustrated along the abscissa the degree of rotation of the carrier wheels from 0° horizontal with the extent of the stroke of the cam surfaces of the first and second cam mechanisms, i.e., the extent of axial displacement of pushers 26 and pivotal displacement of trim heads 140. For example, the line designated A—A in FIG. 15 indicates the stroke of the pushers as the first carrier wheel rotates as a function of the degree of rotation from 0° horizontal. The line B—B illustrates the stroke of the lever arms 154 and, hence, trim heads 140 as the second carrier wheel rotates and the second cam mechanism moves, e.g., pivots the trim heads toward and away from the mandrel, as a function of the degree of rotation of the second carrier wheel from 0° horizontal. The third line, designated C—C, affords an indication of the timing of the supply of air to the mandrels as a function of the rotary position of the mandrels.

Figure 16:
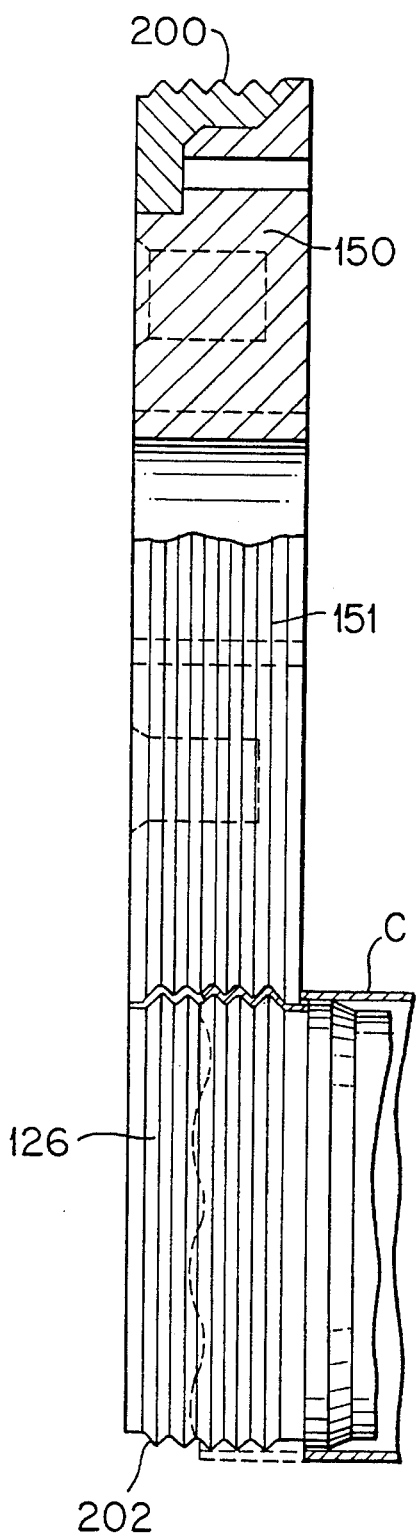
FIG. 16 is a cross-sectional view with portions in elevation illustrating the cooperation of the beading rollers of the trim head and mandrel for beading the scrap material cut from the open end of the can.
Figure 18:
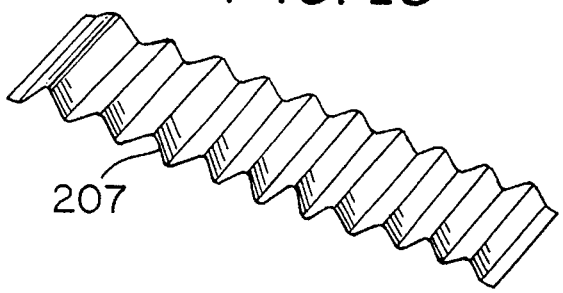
FIG. 18 is a perspective view of a scrap ring corrugated in an axial extending direction relative to the can.
Figure 19:
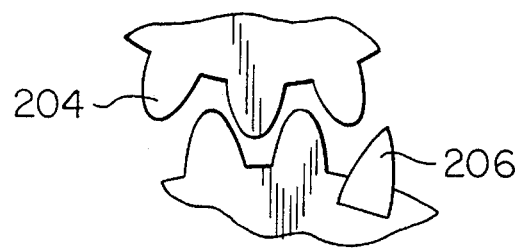
FIG. 19 is a fragmentary enlarged view of gearing with a knife cutter for cutting the scrap material in an axial direction.
Figure 17:
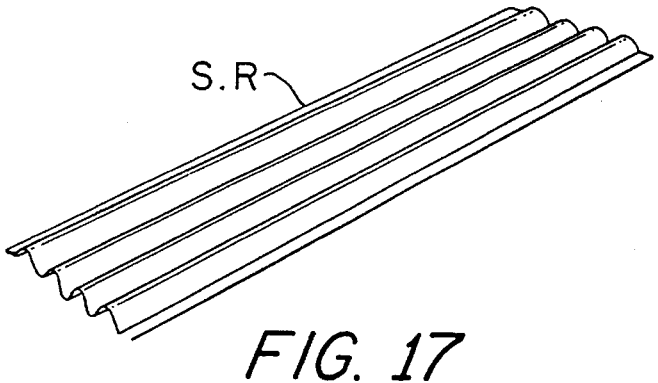
FIG. 17 is a perspective view of a piece of linearly extending scrap material as it emerges from the can trimmer.

Referring now to drawings FIGS. 16–19, there is illustrated a mechanism for beading the scrap material cut from the end of the can, forming a longitudinal cut through the scrap material or ring and discharging the scrap material as a substantially linearly extending article. In FIG. 16, it will be appreciated that the beading roller 150 behind knife edge 151 has a circumferential surface which has axially spaced grooves 200 at axially spaced positions thereabout. Similarly, the beading roller 126 on the spindle 110 has similar grooves 202 about its outer surface which lie essentially in mesh, but out of contact with, the beading roller surface 200 of beading roller 150. As illustrated in FIG. 9A, a longitudinally extending knife edge 203 on beading roller 150 cooperates with a longitudinally extending groove 205 on beading roller 126 to sever the scrap ring S.R. cut from the end of the can in a longitudinal direction. The severed scrap ring S.R., because of the beading rollers, exits from the nip of the rollers through a scrap discharge in substantial linear form as illustrated in FIG. 17. In FIGS. 18 and 19, instead of grooves extending annularly about the trim head and mandrel rollers, the corresponding portions of those rollers have gears 204 which form a scrap ring 207 (FIG. 18) corrugated in a longitudinal direction. The roller on the mandrel mounts a longitudinally extending cutting edge 206 for forming a longitudinal slit along the scrap ring cut from the can whereby the scrap ring illustrated in FIG. 18 may be ejected from the trimming machine.

From a review of FIG. 1A, it will be seen that cans having uneven open ends requiring trimming are supplied to the star wheels 24 by way of a can inlet station 170. The cans are disposed along a track for successive disposition on the arcuate surfaces 25 of the star wheels as the star wheels are rotated by the shaft 18 about the trimmer. From this drawing figure, it will be appreciated that the cans C are loaded onto the star wheels 24 at a position about 30° elevated above 0° horizontal. The can discharge station 172 is located approximately at the bottom of the can trimmer and the cans are successively unloaded from the star wheels 24 onto the discharge 172. A finger 174 mounted on the bars 36 projects into the path of movement of the cans on the star wheel and extracts each can from its pocket 25 on the star wheels for in-line discharge from the can trimmer via discharge 172.

In operation, the cans C, for example, as illustrated in FIG. 1A, are loaded onto the star wheels 24 for rotation in a clockwise direction at a location, for example, about 30° from 0° horizontal. The cans are loaded with their closed ends in opposition to the pushers 26, particularly the pusher heads 76. The open untrimmed ends of the cans are located in alignment with the mandrels 30. Consequently, it will be appreciated that the concave recesses 25 of the star wheels locate the cans in axial alignment with the pushers and the mandrels, these elements being rotated about the axis of shaft 18 by motor M.

As the star wheels rotate, the first cam mechanism 28 at about the same time the cans are placed on the star wheels operates to advance the pushers into engagement with the bottoms of the cans as schematically illustrated in FIG. 15 by the inclination of the stroke line A—A at 180. It will be appreciated that the leading edges of the mandrels are slightly tapered to facilitate axial displacement of the open, untrimmed ends of the cans onto the mandrels 30. As the star wheel and carrier wheels continue to rotate with the pushers and mandrels in axial alignment with one another, the cans C are gradually displaced by the action of the cam followers 80 along the cam track 82 to push the cans onto the mandrels 30. As indicated in FIG. 15, at approximately 140° air is starting to be supplied within the interior of the can as the can approaches its fully seated coaxial position on mandrel 30. Thus, as the can advances toward its fully seated position at a circumferential position of about 150° from 0° horizontal, the passages 117 (FIG. 3) successively rotate into communication with the arcuately-shaped opening 109 of the valve for supplying air to the mandrels via passages 102, 104, 106, slot 109, and passages 117, 119 and 121. As will be recalled, each mandrel is slightly larger in diameter than the interior diameter of the can and, consequently, a tight friction fit between the can and mandrel is achieved whereby the can cannot rotate or slip relative to the mandrel. Thus, as schematically illustrated in FIG. 15, air under pressure is supplied to mandrels 30 as indicated at 182 along line C—C in FIG. 15. The air exits the mandrel between the bottom of the can and the end face of the mandrel to pressurize the interior of the can. The air pressure is sufficient to bias the can for displacement from the mandrel into following engagement with the pusher head lying in engagement with the bottom of the can. With the pusher head fixed in precise axial position by the first cam mechanism, it will be appreciated that the can is maintained on the mandrel at a precision location vis-a-vis the pusher head and the knife edge 124 as the can rotates about the axis of shaft 18 and the axis of spindle 110.

During the next 40° of rotation, i.e., from 150° to 190°, the second cam mechanism 34 pivots the trim head 140 into a position for cutting or trimming the open end of the can. Particularly, the cam roller 156 in cam track 158 pivots the lever 154 about pin 144 to pivot the trim head 140 such that the rotating trim head knife edge 151 forms a scissors cutting action with the rotating knife edge 124 of the knife 122 on spindle 110. With the pusher head 76 holding the bottom of the can and the air pressure maintaining the can in following engagement with the axially stationary pusher head, the excess can material is trimmed from the top of the can as the can C rotates about the axis of spindle 110. That is, the driven knife edge 124 rotates with the can to sever the excess can material in cooperation with the driven knife edge 151 of the trim head. More particularly, it will be recalled that the planetary gear 112 for each mandrel lies in meshing engagement with the gear teeth 100 of the sun gear 98. Consequently, upon rotation of the second carrier wheel 22 about the axis of shaft 18, the planetary gear 112 rotates mandrel 30, drive gear 127 and driven gear 153 such that the knife edges cooperate to cut about the untrimmed end of the can, forming a cut scrap ring. This cutting action occurs as the cans are being rotatably transported about the axis shaft 18 for approximately 40° of rotation as indicated at 184 along line B—B in FIG. 15.

As the pushers successively pass approximately the end of 190° of rotation, the first cam mechanism starts to withdraw or retract the pushers 26 in an axial direction away from the mandrels 30. As the cut scrap ring S.R. (FIG. 17) is formed, the scrap ring is beaded by the beading rollers 126 and 150. The cut ring S.R. is severed in an axial direction by the axially extending knife edge facilitating its release from about the mandrel and kick-out in substantially a linear strip to one side of the trimmer. Because the air pressure supplied the mandrels 30 and, hence, inside the cans, is sufficient to displace the cans from the mandrels, each can will follow the retracting movement of its associated pusher head 76. At the end of approximately 230° of rotation from the horizontal, the second cam mechanism causes the trim head to pivot and return to a position spaced from the mandrel 30. At about 230° of rotation from 0° horizontal, the cut scrap ring is ejected from the trimmer, for example, as indicated by the dashed line 190 in FIG. 15. At approximately 260° rotation from 0° horizontal, indicated at 191 in FIG. 15, each air passage 117 previously in communication with air under pressure via the arcuate slot 109 moves out of registry with the slot, cutting off the air supply to the mandrel and the interior of the can. The air supply cut-off occurs simultaneously with the discharge of each can from the star wheel onto the discharge chute 172. It will be appreciated at the time of discharge, the pusher is fully retracted and the trim head is continuing to return to a position spaced from the mandrel, as schematically indicated at 191 in FIG. 15 along the line B—B. At the completion of 360° of rotation, the cycle repeats.

The sun gear, cam track and lever arrangement can be used for other than can trimming. For example, this arrangement may be used to spin form the neck of a can.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A can trimmer comprising:

a rotatable main drive shaft;

first and second spaced supports for supporting opposite ends of said shaft;

a first carrier wheel carried for rotation by said drive shaft and carrying a plurality of pushers at circumferentially spaced locations about said carrier wheel;

a first cam mechanism carried by said first support cooperable with said pushers for advancing and retracting said pushers in directions generally parallel to the axis of said drive shaft at predetermined circumferential locations about said shaft;

a second carrier wheel carried by said shaft for rotation therewith and carrying a plurality of mandrels at circumferentially spaced positions thereabout in axial alignment with said pushers, respectively, each of said mandrels adapted to receive an open end of a can and a can thereabout and carrying a knife edge about an axis of said mandrel;

a plurality of trim heads carried by said second carrier wheel at circumferentially spaced positions thereabout and mounted for rotation with said second carrier wheel, said trim heads being spaced from and externally of corresponding mandrels, respectively, and having a knife edge;

each said trim head and the knife edge carried thereby being pivotally mounted on said second carrier wheel for pivotal movement toward a corresponding mandrel and said axis thereof for trimming excess material from a can and for movement away from said corresponding mandrel and said mandrel axis;

a second cam mechanism carried by said second support cooperable with said trim heads for pivoting said trim heads toward and away from respective corresponding mandrels at predetermined circumferential locations about the shaft; and at least one can carrier wheel carried by said shaft for rotation therewith and disposed between said first and second carrier wheels for receiving untrimmed cans for location between said pushers and said mandrels;

said pushers under control of said first cam mechanism enabling axial displacement of the cans onto corresponding mandrels for trimming by said trim heads upon pivoting thereof toward said mandrels; and a sun gear carried by one of said first and second supports, each of said mandrels being mounted for rotation about an axis parallel to said drive shaft, and gears coupled to said mandrels and in engagement with said sun gear for rotating said mandrels in response to rotation of said second carrier wheel relative to said sun gear.

2. A can trimmer according to claim 1 including a base for mounting said supports, said base including a pair of bars extending in an axial direction, said first support being releasably fixed to said bars, and an adjustment mechanism cooperable between said bars and said first support for adjustably moving said first support along said bars into a selected adjusted position relative to said second support to selectively axially space said pushers carried by said first support relative to said mandrels enabling cans of different heights for disposition between said pushers and said mandrels.

3. A can trimmer according to claim 1 wherein said first cam mechanism includes a generally annular cam track and at least one follower surface carried by said pushers for following said cam track.

4. A can trimmer according to claim 3 wherein said cam track comprises a rib raised from a surface carried by said first support and said follower surface includes a pair of rollers straddling said raised rib.

5. A can trimmer according to claim 3 wherein said cam track comprises a groove recessed in a surface carried by said first support and said follower surface includes a roller in said groove.

6. A can trimmer according to claim 1 wherein said second cam mechanism includes a plurality of lever arms carrying said trim heads, respectively, said lever arms being pivotally carried by said second carrier wheel for rotation therewith, said second cam mechanism in part also including a cam follower carried by each said lever arm for pivoting the lever arm and the trim head carried thereby for movement toward and away from the mandrel at predetermined circumferential locations about said shaft.

7. A can trimmer according to claim 1 including a plurality of lever arms carrying said trim heads, respectively, said lever arms being pivotally carried by said second carrier wheel for rotation therewith, said second cam mechanism in part including a cam follower carried by each said lever arm for pivoting the lever arm and the trim head carried thereby for movement toward and away from the mandrel at predetermined circumferential locations about said shaft, said second cam mechanism also including a cam surface carried by said sun gear against which said cam follower engages for pivoting said lever arm.

8. A can trimmer according to claim 1 including passages carried by said second carrier wheel for transmitting a fluid under pressure to said mandrels, each of said mandrels having a fluid outlet for communicating fluid under pressure into a can disposed on the mandrel and biasing the can for engagement against and following movement with a corresponding pusher.

9. A can trimmer according to claim 8 including a valve for periodically passing the fluid under pressure into said passages in response to rotation of said second carrier wheel.

10. A can trimmer according to claim 1 in combination with a plurality of cans having a predetermined interior diameter, said mandrels having an exterior diameter slightly larger than the interior diameter of said cans to prevent relative rotation of said cans on said mandrels during trimming.

11. A can trimmer according to claim 10 wherein said mandrels have longitudinally extending flutes enabling reception of the cans on the mandrels substantially without stretching the material of the can.

12. A can trimmer according to claim 1 wherein each said pusher includes a shaft and a pusher head freely rotatably carried by said shaft for rotation about the axis of said pusher shaft.

13. A can trimmer according to claim 1 wherein the excess material trimmed from the can is in the form of a scrap ring, and including a pair of rollers, one of said rollers having a cutting edge extending generally parallel to the axis of the mandrel and disposed on the side of the knife edges of said mandrel and said trim head away from the axially aligned pusher for severing the scrap ring in a longitudinal direction of the can, the rollers forming the severed scrap ring into a substantially linear form.

14. A can trimmer according to claim 13 including a scrap ring discharge and including means for corrugating the scrap ring for removal along said scrap ring discharge.

15. A can trimmer comprising:

a rotatable main drive shaft;

first and second spaced supports for supporting opposite ends of said shaft;

a first carrier wheel carried for rotation by said drive shaft and carrying a plurality of pushers at circumferentially spaced locations about said carrier wheel;

a first mechanism carried by said first support cooperable with said pushers for advancing and retracting said pushers in directions generally parallel to the axis of said drive shaft at predetermined circumferential locations about said shaft;

a second carrier wheel carried by said shaft for rotation therewith and carrying a plurality of mandrels at circumferentially spaced positions thereabout in axial alignment with said pushers, respectively, for receiving open ends of cans and the cans thereabout;

a plurality of trim heads carried by said second carrier wheel at circumferentially spaced positions thereabout and mounted for rotation with said second carrier wheel, said trim heads being disposed adjacent corresponding mandrels, respectively;

each said trim head being mounted on said second carrier wheel externally of a corresponding mandrel and for movement toward and away from said corresponding mandrel for trimming excess material from a can;

a second mechanism carried by said second support cooperable with said trim heads for moving said trim heads toward and away from respective corresponding mandrels at predetermined circumferential locations about the shaft;

said pushers under control of said first mechanism enabling axial displacement of the cans onto corresponding mandrels for trimming by said trim heads upon movement thereof toward said mandrels;

a base for mounting said supports, said base including a pair of bars extending in an axial direction, said first support being releasably fixed to said bars, and an adjustment mechanism cooperable between said bars and said first support for adjustably moving said first support along said bars into a selected adjusted position relative to said second support to selectively axially displace said pushers carried by said first support relative to said mandrels enabling cans of different heights for disposition between said pushers and said mandrels; and a sun gear carried by one of said first and second supports, each of said mandrels being mounted for rotation about an axis parallel to said drive shaft, and gears coupled to said mandrels and in engagement with said sun gear for rotating said mandrels in response to rotation of said second carrier wheel relative to said sun gear.

16. A can trimmer according to claim 15 wherein said adjustment mechanism includes a mount carrying an elevating screw for elevating said first support and said mount and supporting the can trimmer at one end of said elevating screw, and a screw cooperable between said mount and said first support.

17. A can trimmer according to claim 13 wherein said second mechanism includes a plurality of lever arms carrying said trim heads, respectively, said lever arms being pivotally carried by said second carrier wheel for rotation therewith, said second mechanism in part also including a cam follower carried by each said lever arm for pivoting the lever arm and the trim head carried thereby for movement toward and away from the mandrel at predetermined circumferential locations about said shaft.

18. A can trimmer according to claim 17 including a plurality of lever arms carrying said trim heads, respectively, said lever arms being pivotally carried by said second carrier wheel for rotation therewith, said second mechanism in part including a cam follower carried by each said lever arm for pivoting the lever arm and the trim head carried thereby for movement toward and away from the mandrel at predetermined circumferential locations about said shaft, said second mechanism also including a cam surface carried by said sun gear against which said cam follower engages for pivoting said lever arm.

19. A can trimmer according to claim 15 including passages carried by said second carrier wheel for transmitting a fluid under pressure to said mandrels, each of said mandrels having a fluid outlet for communicating fluid under pressure into a can disposed on the mandrel and biasing the can for engagement against and following movement with a corresponding pusher thereby enabling axial displacement of the can from the mandrel in response to retracting movement of said pushers.

* * * * *